US008543266B2

(12) United States Patent
Li et al.

(10) Patent No.: US 8,543,266 B2
(45) Date of Patent: Sep. 24, 2013

(54) MODIFIED KALMAN FILTER FOR GENERATION OF ATTITUDE ERROR CORRECTIONS

(75) Inventors: Rongsheng Li, Hacienda Heights, CA (US); Tung-Ching Tsao, Torrance, CA (US); Arunkumar P. Nayak, Van Nuys, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/251,785

(22) Filed: Oct. 3, 2011

(65) Prior Publication Data

US 2013/0085628 A1 Apr. 4, 2013

(51) Int. Cl.
*B64G 1/36* (2006.01)
(52) U.S. Cl.
USPC .......... 701/13; 701/4; 701/472; 701/530; 455/431; 455/504; 455/517; 342/357.32; 342/359; 702/94
(58) Field of Classification Search
USPC .......... 701/150, 532, 510, 507, 500, 472, 701/470, 4, 14, 13, 530; 600/587, 595; 342/106, 107, 22, 357, 451, 90, 357.32, 342/359; 244/3.1; 702/94; 455/431, 504, 455/517
See application file for complete search history.

(56) References Cited

U.S. PATENT DOCUMENTS

| | | | |
|---|---|---|---|
| 4,823,134 A * | 4/1989 | James et al. | 342/359 |
| 2002/0198656 A1* | 12/2002 | Ford et al. | 701/213 |
| 2004/0030464 A1* | 2/2004 | Buchler et al. | 701/4 |
| 2004/0150557 A1* | 8/2004 | Ford et al. | 342/357.14 |
| 2005/0060092 A1* | 3/2005 | Hablani | 701/213 |
| 2007/0023579 A1* | 2/2007 | Wang et al. | 244/158.6 |
| 2008/0046138 A1* | 2/2008 | Fowell et al. | 701/13 |
| 2009/0299494 A1* | 12/2009 | Kahn | 700/28 |
| 2010/0228481 A1* | 9/2010 | Kamel et al. | 701/226 |

* cited by examiner

*Primary Examiner* — Tuan C. To
*Assistant Examiner* — Jelani Smith
(74) *Attorney, Agent, or Firm* — Hope Baldauff, LLC (57) ABSTRACT

Methods, systems, and computer-readable media are described herein for using a modified Kalman filter to generate attitude error corrections. Attitude measurements are received from primary and secondary attitude sensors of a satellite or other spacecraft. Attitude error correction values for the attitude measurements from the primary attitude sensors are calculated based on the attitude measurements from the secondary attitude sensors using expanded equations derived for a subset of a plurality of block sub-matrices partitioned from the matrices of a Kalman filter, with the remaining of the plurality of block sub-matrices being pre-calculated and programmed into a flight computer of the spacecraft. The propagation of covariance is accomplished via a single step execution of the method irrespective of the secondary attitude sensor measurement period.

18 Claims, 4 Drawing Sheets

$$F = \begin{bmatrix} f_{11} & f_{12} & f_{13} & f_{14} & f_{15} & f_{16} & f_{17} & f_{18} \\ f_{21} & f_{22} & f_{23} & f_{24} & f_{25} & f_{26} & f_{27} & f_{28} \\ f_{31} & f_{32} & f_{33} & f_{34} & f_{35} & f_{36} & f_{37} & f_{38} \\ f_{41} & f_{42} & f_{43} & f_{44} & f_{45} & f_{46} & f_{47} & f_{48} \\ f_{51} & f_{52} & f_{53} & f_{54} & f_{55} & f_{56} & f_{57} & f_{58} \\ f_{61} & f_{62} & f_{63} & f_{64} & f_{65} & f_{66} & f_{67} & f_{68} \\ f_{71} & f_{72} & f_{73} & f_{74} & f_{75} & f_{76} & f_{77} & f_{78} \\ f_{81} & f_{82} & f_{83} & f_{84} & f_{85} & f_{86} & f_{87} & f_{88} \end{bmatrix} = \begin{bmatrix} F_{11} & F_{12} & F_{13} \\ F_{21} & F_{22} & F_{23} \\ F_{31} & F_{32} & F_{33} \end{bmatrix}$$

MODIFIED KALMAN FILTER FOR GENERATION OF ATTITUDE ERROR CORRECTIONS

GOVERNMENT RIGHTS

This invention was made with Government support under contract no. FA8808-06-C-00011 awarded by the Department of Defense. The Government has certain rights in this invention.

BACKGROUND

The performance of a satellite-based communication system may rely on the ability to precisely position and point the associated communication satellites. The current attitude of a communication satellite or other spacecraft may be determined from onboard inertial sensors, such as gyroscopes, that measure rotational rates of the spacecraft. A flight computer or other guidance control system may maintain the current attitude of the spacecraft by integrating these rotational rates. However, small errors in the measured rotational rates may cause the attitude to "drift," i.e. propagate into larger and larger errors in attitude measurement over time. To correct these errors, the flight computer may utilize attitude measurements from additional onboard attitude positional sensors ("APS"), such as star field trackers, terrestrial RF beacons, horizon sensors, and the like, that may periodically provide a measurement of the spacecraft's current position.

In order to combine the attitude measurements from the inertial sensors and those from the secondary APS, the flight computer may utilize a conventional Kalman filter, such as an 8-state Kalman filter. A Kalman filter uses a system's dynamics model (such as the physical laws of motion of a satellite), known control inputs to that system, and measurements (such as those from the inertial sensors or APS) to form an estimate of the system's varying quantities (its state) that is better than the estimate obtained by using any one measurement alone. However, the calculations involving the 8×8 matrices in the 8-state Kalman filter may be computationally intensive, requiring more processing power than may be available on older generation computers, such as those tested and qualified flight-ready for satellites and other spacecraft. In addition, if the attitude measurements from the secondary APS are irregular and/or infrequent, the computationally intensive Kalman filter calculations may be executed multiple times without new information from which to better correct errors in the primary inertial sensor measurements, thus wasting processor throughput in the flight computer.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for using a modified Kalman filter to generate attitude error corrections. According to embodiments presented herein, attitude measurements are received from primary and secondary attitude sensors of a satellite or other spacecraft. Attitude error correction values for the attitude measurements from the primary attitude sensors are calculated based on the attitude measurements from the secondary attitude sensors using expanded equations derived for a subset of a plurality of block sub-matrices partitioned from the matrices of a Kalman filter, with the remaining of the plurality of block sub-matrices being pre-calculated and programmed into a flight computer of the spacecraft.

The features, functions, and advantages discussed herein can be achieved independently in various embodiments of the present invention or may be combined in yet other embodiments, further details of which can be seen with reference to the following description and drawings.

DETAILED DESCRIPTION

The following detailed description is directed to methods, systems, and computer-readable media for using a modified Kalman filter to generate attitude error corrections. Utilizing the concepts and technologies described herein, a numerically efficient modified Kalman filter may be implemented that requires far less processor throughput than a traditional 8-state Kalman filter. The solution takes advantage of the sparse nature of the 8×8 matrices in the traditional 8-state Kalman filter by partitioning the matrices into 3×3, 3×2, 2×3, and 2×2 block matrices and eliminating a significant portion of the unnecessary calculations. In addition, the covariance propagation calculations are performed in single step, instead of many iterations of short step time, using analytically derived equations to handle asynchronous measurements from secondary sensors having a large sample time. Body-reference frame equations are also utilized that are simpler and more efficient than earth-centered inertial ("ECI") frame equations. The attitude corrections from the modified Kalman filter may then be transformed back to the ECI frame before being provided to the flight computer.

While the subject matter described herein is presented in the general context of program modules that execute in conjunction with other modules on a flight computer of a spacecraft, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including ground-based flight computers, distributed computing architectures, multiprocessor systems, mainframes, minicomputers, microprocessor-based desktop computers, hand-held devices, special-purpose hardware devices, and the like.

In the following detailed description, references are made to the accompanying drawings that form a part hereof and that show, by way of illustration, specific embodiments or examples. In referring to the drawings, like numerals represent like elements throughout the several figures.

Figure 1:
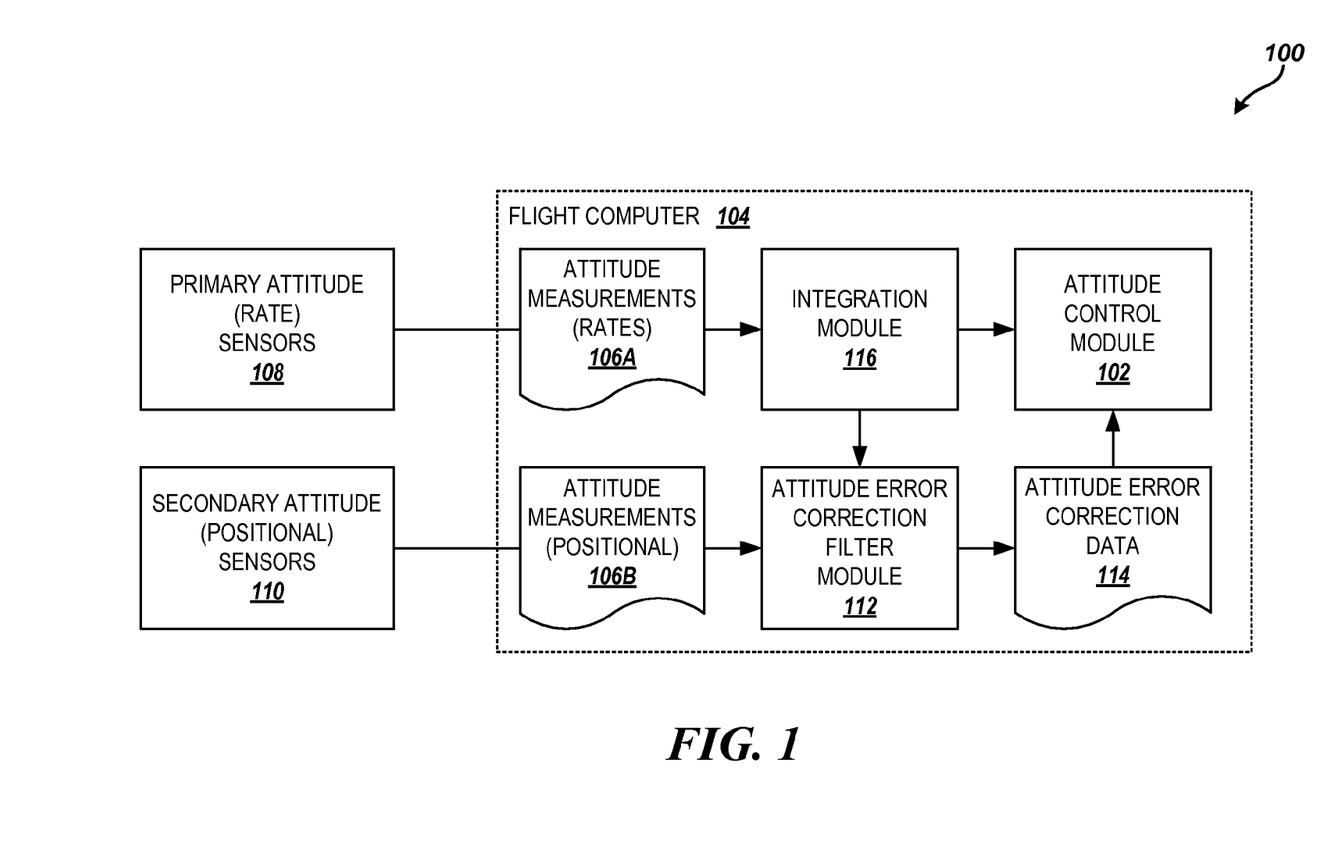
FIG. 1 is a block diagram showing aspects of an illustrative operating environment and software components provided by the embodiments presented herein.

FIG. 1 shows an illustrative operating environment 100 including software components for using a modified Kalman filter to generate attitude error corrections, according to embodiments provided herein. The environment 100 includes an attitude control module 102 executing on a flight computer 104. The flight computer 104 may represent a computer or computers onboard a communication satellite or other spacecraft, a ground-based flight computer in communication with the spacecraft, an avionics system of an aircraft, a flight-simulation computer, and the like. The attitude control module 102 may be responsible for determining the attitude of the spacecraft as well as precisely pointing or "steering" the spacecraft in order to place the spacecraft in a particular orientation with respect to a body-reference frame or ECI frame as required for proper operation of the spacecraft. The attitude control module 102 may be implemented as software, hardware, or a combination of the two and may execute on one or more processors of the flight computer 104.

The flight computer 104 may receive attitude measurements 106A (referred to herein generally as attitude measurements 106) from primary attitude sensors 108 onboard the spacecraft. According to embodiments, the primary attitude sensors 108 comprise inertial sensors, such as gyroscopes. The attitude measurements 106A received from the primary attitude sensors 108 may comprise rotational rates. An integration module 116 may integrate the rotational rates received from the primary attitude sensors 108 in order to determine a current attitude of the spacecraft. The attitude control module 102 may receive the integrated rotational rates. The integration module 116 may receive the attitude measurements 106A from the primary attitude sensors 108 at a frequent and regular interval, such as at a rate between 0.1 KHz to 10 KHz. As discussed above, small errors in the rotational rates comprising the attitude measurements 106A received from the primary attitude sensors 108 may cause the current attitude determined by the attitude control module 102 to drift over time.

In order to correct the drift in the attitude determination, the attitude control module 102 may further utilize attitude measurements 106B received from secondary attitude sensors 110. The secondary attitude sensors 110 may comprise attitude positional sensors ("APS"), such as star field trackers, terrestrial RF beacons, horizon sensors, and the like. The secondary APS 110 may be located onboard the spacecraft and/or on the ground and are configured to relay the corresponding positional attitude measurements 106B regarding the spacecraft to the flight computer 104. According to further embodiments, the secondary attitude sensors 110 may produce the positional attitude measurements 106B at an infrequent and/or irregular rate, such as once a minute or once an hour.

The environment 100 further includes an attitude error correction filter module 112 executing on the flight computer 104. The attitude error correction filter module 112 may be implemented as software, hardware, or a combination of the two and may execute on one or more processors of the flight computer 104. According to embodiments, the attitude error correction filter module 112 implements a modified Kalman filter that combines the positional attitude measurements 106B from the secondary APS 110 with the integrated rotational rates comprising the attitude measurements 106A from the primary attitude sensors 108 in order to generate attitude error correction data 114, as will be described in more detail below in regard to FIG. 2. The attitude control module 102 utilizes the attitude error correction data 114 to counteract the drift in the current attitude as calculated from the rotational rates received from the primary attitude sensors 108.

Figure 2:
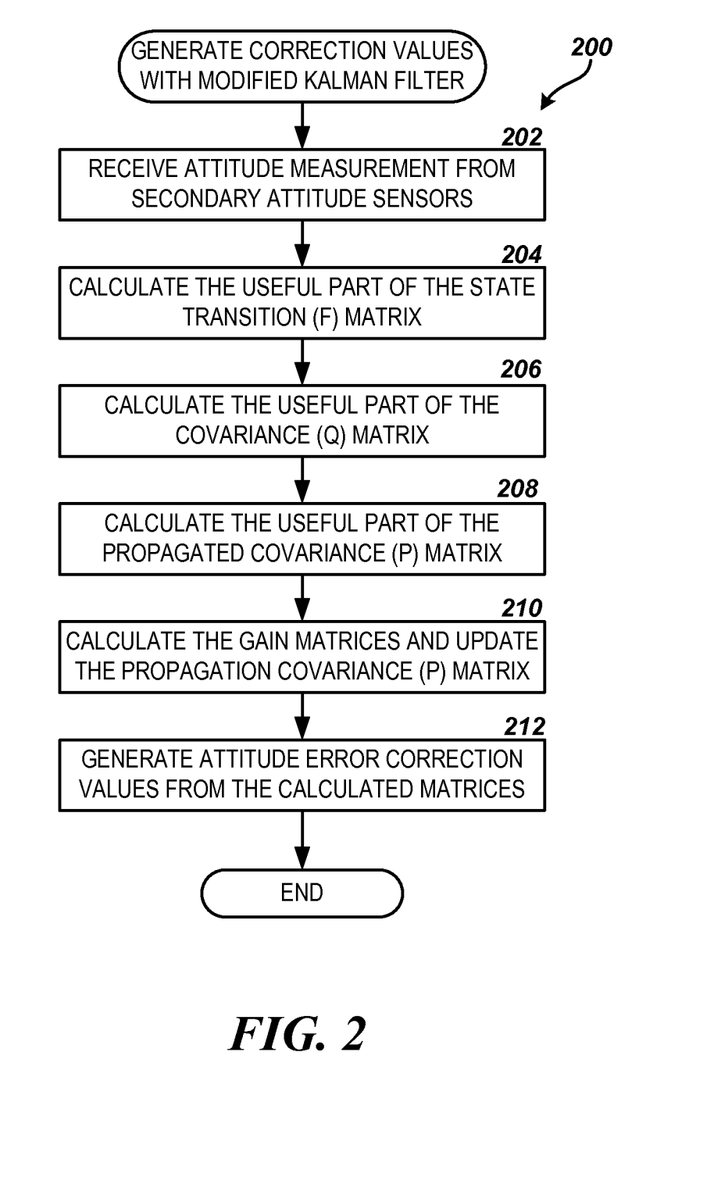
FIG. 2 is a flow diagram illustrating one method for using a modified Kalman filter to generate attitude error corrections, as provided in the embodiments presented herein.

Turning now to FIG. 2, additional details will be provided regarding embodiments presented herein for using a modified Kalman filter to generate attitude error corrections. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 2 shows a routine 200 for using equations derived from a Kalman filter algorithm to generate attitude error correction data 114 for use by the attitude control module 102 in calculating current attitude of the spacecraft. In one embodiment, the routine 200 is performed by the attitude error correction filter module 112 described above in regard to FIG. 1. It will be appreciated that the routine 200 may also be performed by another module or component of the flight computer 104, or by any combination of modules and components.

The routine 200 begins at operation 202, where the attitude error correction filter module 112 receives attitude measurements 106B from the secondary attitude sensors 110. For example, the attitude error correction filter module 112 may receive positional attitude measurements 106B from the secondary APS 110 from a terrestrial-based RF beacon detected at the spacecraft. As described above in regard to FIG. 1, the attitude measurements 106B from the secondary attitude sensors 110 may be received irregularly and/or infrequently, such as approximately once a minute or once an hour.

Figure 3:
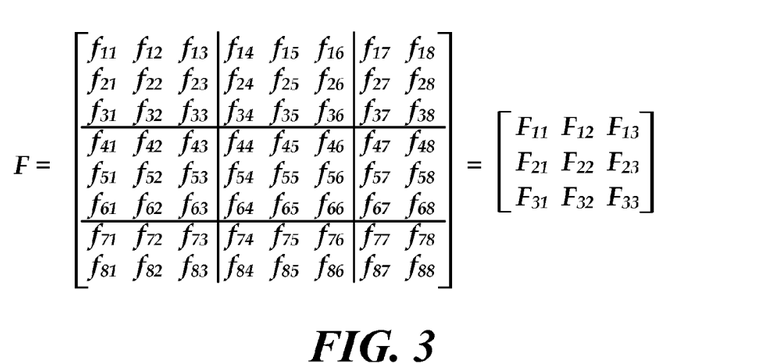
FIG. 3 is a mathematical formula showing an illustrative partitioning of an 8×8 matrix, according to embodiments presented herein.

From operation 202, the routine 200 proceeds to operation 204, where the attitude error correction filter module 112 calculates the useful part of the state-transition matrix, referred to generally as the F matrix, using the newly received positional attitude measurements 106B from the secondary APS 110. According to embodiments, the attitude error correction filter module 112 performs only a subset of the calculations traditionally performed in an 8-state Kalman filter. This is accomplished by partitioning the 8×8 matrices into 3×3, 3×2, 2×3, and 2×2 block matrices. For example, as shown in FIG. 3, the 8×8 F matrix may be partitioned into nine block sub-matrices: $F_{11}$, $F_{12}$, $F_{13}$, $F_{21}$, $F_{22}$, $F_{23}$, $F_{31}$, $F_{32}$, and $F_{33}$. The $F_{11}$, $F_{12}$, $F_{21}$, and $F_{22}$ sub-matrices are 3×3 matrices, the $F_{13}$ and $F_{23}$ sub-matrices are 3×2 matrices, the $F_{31}$ and $F_{32}$ sub-matrices are 2×3 matrices, and the $F_{33}$ sub-matrix is a 2×2 matrix. It will be appreciated that other partitioning schemes resulting in other block sub-matrices may be possible, and partitioning the matrices into more granular sub-matrices may provide for additional efficiency but may make the model overly complex.

After partitioning, the Kalman filter equations for the traditional 8×8 matrices are expanded into a series of smaller equations for the sub-matrices, each of which is numerically less intensive than the 8×8 equations. The equations for those block sub-matrices containing zero values may be dropped, and others resulting in fixed values may be pre-calculated, leaving a number of smaller, less computationally intensive equations for the important sub-matrices to be performed by the attitude error correction filter module 112. It will be further appreciated the partitioning of the matrix into smaller block sub-matrices, the expansion of the equations for the block sub-matrices, and the determination of the resulting consequential sub-matrices and expanded equations may be analytically derived offline, with the resulting model programmed into the attitude error correction filter module 112 of the flight computer 104. Thus, the calculations performed by the attitude error correction filter module 112 may be far more numerically efficient and require far less processing power than those of a traditional 8-state Kalman filter.

According to one embodiment, using the expanded equations described above, the attitude error correction filter module 112 performs the following calculations to update the $F_{11}$ and $F_{12}$ sub-matrices of the state-transition (F) matrix:

$$\Delta t = t_2 - t_1$$

$$c = \cos(\omega \Delta t)$$

$$s = \sin(\omega \Delta t)$$

$$F_{11} = \begin{bmatrix} c & 0 & s \\ 0 & 1 & 0 \\ -s & 0 & c \end{bmatrix}$$

$$F_{12} = -\begin{bmatrix} -s/\omega & 0 & c-1/\omega \\ 0 & 1-\Delta t & 0 \\ -2\sin^2\left(\frac{\omega \Delta t}{2}\right)/\omega & 0 & -s/\omega \end{bmatrix}$$

Where $\Delta t$ represents the time between positional attitude measurements 106B and $\omega$ represents the rotational rate. It will be noted that the calculations require only one sine and one cosine function be calculated, significantly reducing the processing power required for the calculations. The remaining equations use only simple algebraic operations. The remainder of the state-transition (F) matrix may be pre-calculated such that:

$$F = \begin{bmatrix} F_{11} & F_{12} & 0_{3\times 2} \\ 0_{3\times 3} & I_{3\times 3} & 0_{3\times 2} \\ 0_{2\times 3} & 0_{2\times 3} & I_{2\times 2} \end{bmatrix}$$

The routine 200 proceeds from operation 204 to operation 206, where the attitude error correction filter module 112 calculates the useful part of the process covariance matrix, or the "Q" matrix. As utilized herein, the Q matrix represents the realization of the covariance matrix of process noise in a "discrete" time, also referred to as $Q_k$. The Q matrix is partitioned in a fashion similar to the F matrix described above, and the attitude error correction filter module 112 performs the following calculations to update the $Q_{11}$, $Q_{12}$, $Q_{21}$, $Q_{22}$ and $Q_{33}$ sub-matrices of the Q matrix:

$$Q_{11} = \begin{bmatrix} s_{arw}\Delta t + 2s_{rrw}\frac{(\omega \Delta t - s)}{\omega^3} & 0 & 0 \\ 0 & s_{arw}\Delta t + \frac{1}{3}s_{rrw}\Delta t^3 & 0 \\ 0 & 0 & s_{arw}\Delta t + 2s_{rrw}\frac{(\omega \Delta t - s)}{\omega^3} \end{bmatrix}$$

$$Q_{12} = -\begin{bmatrix} s_{rrw}\frac{(1-c)}{\omega^2} & 0 & s_{rrw}\frac{(\omega \Delta t - s)}{\omega^2} \\ 0 & \frac{1}{2}s_{rrw}\Delta t^2 & 0 \\ s_{rrw}\frac{(\omega \Delta t - s)}{\omega^2} & 0 & s_{rrw}\frac{(1-c)}{\omega^2} \end{bmatrix}$$

$$Q_{21} = Q_{12}^T$$

$$Q_{22} = s_{rrw}\Delta t I_{3\times 3}$$

$$Q_{33} = s_{brw}\Delta t I_{2\times 2}$$

where $s_{arw}$ is the variance of the inertial rate sensor's angular random walk noise, $s_{rrw}$ is the variance of the inertial rate sensor's rate random walk noise, and $s_{brw}$ is the variance of the beacon bias noise. It will be noted that the $Q_{11}$ sub-matrix is diagonal, and that the $Q_{12}$ sub-matrix has four zeros. The remainder of the Q matrix may be pre-calculated such that:

$$Q = \begin{bmatrix} Q_{11} & Q_{12} & 0_{3\times 2} \\ Q_{21} & Q_{22} & 0_{3\times 2} \\ 0_{2\times 3} & 0_{2\times 3} & Q_{33} \end{bmatrix}$$

From operation 206, the routine 200 proceeds to operation 208, where the attitude error correction filter module 112 calculates the useful part of the propagated covariance matrix, or the "P" matrix. The attitude error correction filter module 112 may use the following equations to calculate the sub-matrices of the predicted propagated covariance matrix, or the "$P^p$" matrix, from the state-transition (F) matrix and the process covariance (Q) matrix:

$$J = F_{12}P_{12}^T F^T$$

$$P^p{}_{11} = F_{11}P_{11}F^T{}_{11} + J + J^T + F_{12}P_{22}F^T{}_{12} + Q_{11}$$

$$P^p{}_{12} = F_{11}P_{12} + F_{12}P_{22} + Q_{12}$$

$$P^p{}_{13} = F_{11}P_{13} + F_{12}P_{23}$$

$$P^p{}_{22} = P_{22} + Q_{22}$$

$$P^p{}_{23} = P_{23}$$

$$P^p{}_{33} = P_{33} + Q_{33}.$$

The routine 200 proceeds from operation 208 to operation 210, where the attitude error correction filter module 112 calculates the useful part of the gain computations. For example, the attitude error correction filter module 112 may first compute the gain sub-matrices $G_1$, $G_2$, and $G_3$ using the following:

$$G = \begin{bmatrix} G_1 \\ G_2 \\ G_3 \end{bmatrix} = \begin{bmatrix} P_{11}^p H_1^T + P_{13}^p H_3^T \\ P_{21}^p H_1^T + P_{23}^p H_3^T \\ P_{31}^p H_1^T + P_{33}^p H_3^T \end{bmatrix}$$

where the H matrix represents the observation matrix of the Kalman filter. Next, the attitude error correction filter module 112 may produce the updated covariance (P) matrix from the gain matrices $G_1$, $G_2$, and $G_3$ and the predicted or propagated covariance ($P^p$) matrix using the following calculations:

$$Z = H_1 G_1 + H_3 G_3 + R$$

$$invZ = \frac{1}{(Z(1,1)Z(2,2) - Z(1,2)Z(2,1))} \begin{bmatrix} Z(2,2) & -Z(1,2) \\ -Z(2,1) & Z(1,1) \end{bmatrix}$$

$$K_1 = G_1(invZ)$$

$$K_2 = G_2(invZ)$$

$$K_3 = G_3(invZ)$$

$$P_{11} = P_{11}^p - K_1 G_1^T$$

$$P_{12} = P_{12}^p - K_1 G_2^T$$

$$P_{13} = P_{13}^p - K_1 G_3^T$$

$$P_{22} = P_{22}^p - K_2 G_2^T$$

$$P_{23} = P_{23}^p - K_2 G_3^T$$

$$P_{33} = P_{33}^p - K_3 G_3^T$$

It will be noted that using the equations above, the attitude error correction filter module 112 may calculate and update the covariance in a single step, instead of multiple, iterative steps as in traditional Kalman filter equations.

From operation 210, the routine 200 proceeds to operation 212, where the attitude error correction filter module 112 generates the attitude error correction data 114 from the gain matrices $G_1$, $G_2$, and $G_3$ calculated above. For example, the attitude error correction filter module 112 may first compute the residual δy using the following:

$$\delta y = y - \hat{y}$$

where y is the actual measurement from the secondary attitude sensor and $\hat{y}$ is the prediction of the value for y based on the propagated Kalman filter state. Next, the attitude error correction filter module 112 calculates the attitude correction in the body-reference frame $\delta^B \theta$ using the following equation:

$$\delta^B \theta = G_1 \delta y$$

According to one embodiment, the attitude error correction filter module 112 may then convert the attitude correction in the body-reference frame $\delta^B \theta$ to an attitude correction in the ECI reference frame $\delta^{ECI} \theta$ using the following equation:

$$\delta^{ECI} \theta = C^{ECI}_B \delta^B \theta$$

where $C^{ECI}_B$ is a time-varying 3×3 matrix representing the spacecraft body to ECI frame transformation matrix. While the body-reference frame calculations are numerically simpler, requiring less processing power to compute, the attitude correction may be converted to the ECI reference frame in order to retain the time-insensitivity of the ECI calculations in the attitude control module 102.

In addition, the attitude error correction filter module 112 may update a gyro bias value and a reference beacon bias value from the gain matrices and the residual using the following equations:

$$b_g = b_g + G_2 \delta y$$

$$b_b = b_b + G_3 \delta y$$

The gyro bias value may be used by the attitude control module 102 on the received integrated value of the inertial sensor rate measurements, in removing the bias rate measurements, while the reference beacon bias may be used to adjust beacon measurements. As described above in regard to FIG. 1, the attitude control module 102 utilizes the generated attitude error correction data 114 to counteract the drift in the current attitude as calculated from the rotational rates received from the primary attitude sensors 108. From operation 212, the routine 200 ends.

Figure 4:
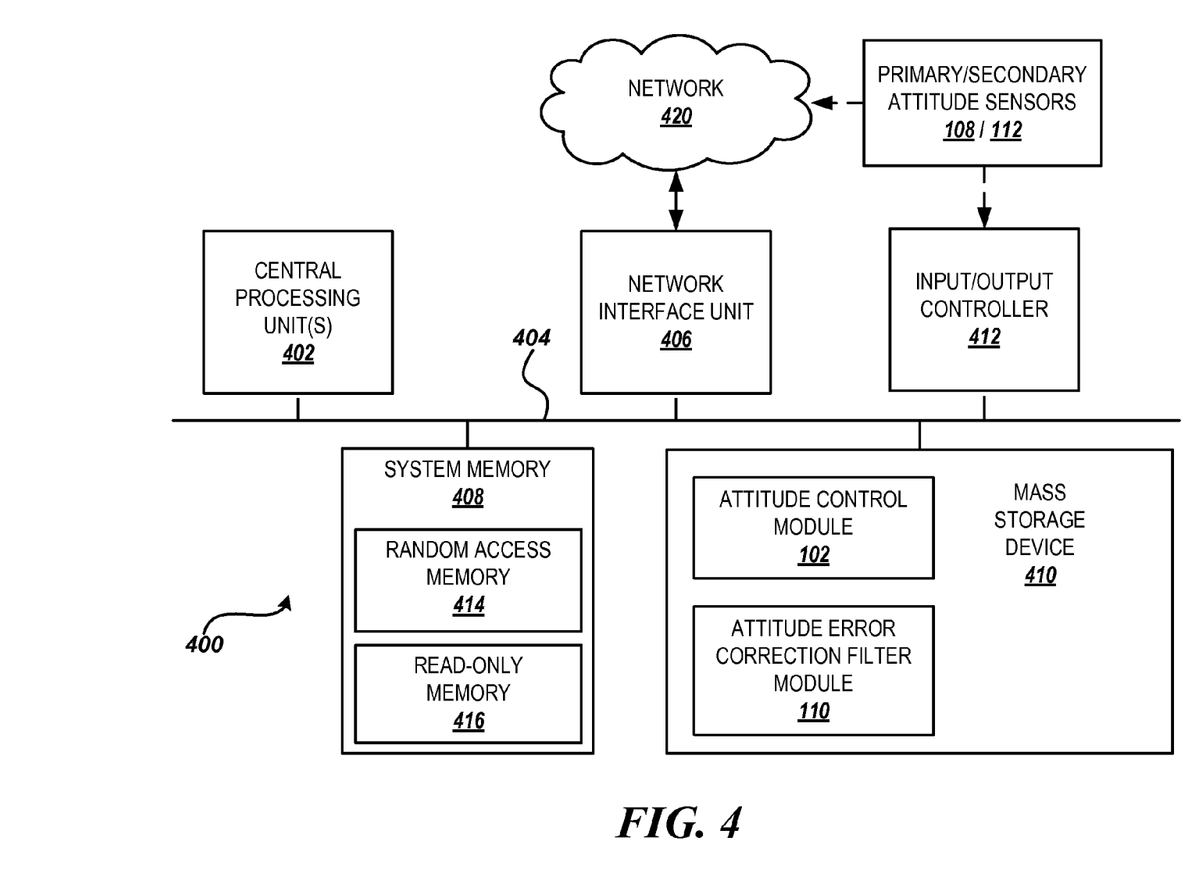
FIG. 4 is a block diagram showing an illustrative computer hardware and software architecture for a computing system capable of implementing aspects of the embodiments presented herein.

FIG. 4 shows an illustrative computer 400 capable of executing the software components described herein for using a modified Kalman filter to generate attitude error corrections, in the manner presented above. The computer 400 may be embodied in a single computing device or in a combination of one or more processing units, storage units, and/or other computing devices implemented in the flight computer 104 of a spacecraft, in ground-based computer systems, or a combination of the two. The computer 400 includes one or more central processing units 402 ("CPUs"), a system memory 408, including a random access memory 414 ("RAM") and a read-only memory 416 ("ROM"), and a system bus 404 that couples the memory to the CPUs 402.

The CPUs 402 may be standard programmable processors that perform arithmetic and logical operations necessary for the operation of the computer 400. The CPUs 402 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 400 also includes a mass storage device 410. The mass storage device 410 may be connected to the CPUs 402 through a mass storage controller (not shown) further connected to the bus 404. The mass storage device 410 and its associated computer-readable media provide non-volatile, non-transitory storage for the computer 400. The mass storage device 410 may store a flight management system and/or other avionics systems for the spacecraft, as well as specific application modules or other program modules, such as the attitude control module 102 and attitude error correction filter module 112 described above in regard to FIG. 1. The mass storage device 410 may also store data collected or utilized by the various systems and modules.

The computer 400 may store programs and data on the mass storage device 410 by transforming the physical state of the mass storage device to reflect the information being stored. The specific transformation of physical state may depend on various factors, in different implementations of this disclosure. Examples of such factors may include, but are not limited to, the technology used to implement the mass storage device 410, whether the mass storage device is characterized as primary or secondary storage, and the like. For example, the computer 400 may store information to the mass storage device 410 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 400 may further read information from the mass storage device 410 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the computer 400. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer 400. According to one embodiment, the computer 400 may have access to computer-readable storage media storing computer-executable instructions that, when executed by the computer, perform the routine 200 for using a modified Kalman filter to generate attitude error corrections, as described above in regard to FIG. 2.

According to various embodiments, the computer 400 may operate in a networked environment using logical connections to other avionics and systems in the spacecraft or to ground computers through a network, such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for providing output to attitude controls and other devices, display units, and the like. Similarly, the input/output controller 412 may receive input from sensor and other devices, such as the primary and secondary attitude sensors 108, 110 described above in regard to FIG. 1. The input/output controller 412 may further receive input from input devices, such as a keyboard, a mouse, an electronic stylus, a touch screen associated with a display unit, and the like. It will be further appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for using a modified Kalman filter to generate attitude error corrections are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium comprising computer-executable instructions that, when executed by a computer, cause the computer to:
   receive attitude measurements from secondary attitude sensors; and
   generate attitude error correction values for attitude measurements from primary attitude sensors based on the attitude measurements from the secondary attitude sensors using expanded equations derived for a subset of a plurality of block sub-matrices partitioned into 3×3, 3×2, 2×3, and 2×2 blocks from the matrices of a 8×8 Kalman filter, a remainder of the plurality of block sub-matrices being pre-calculated.

2. The non-transitory computer-readable storage medium of claim 1, comprising further computer-executable instructions that cause the computer to propagate and update a covariance of the Kalman filter in a single step with arbitrary update period.

3. The non-transitory computer-readable storage medium of claim 1, wherein the expanded equations derived for the subset of the plurality of block sub-matrices utilize body-reference frame Kalman filter equations, and wherein the attitude error correction values are converted back to earth-centered inertial frame reference value before being provided to an attitude control module.

4. The non-transitory computer-readable storage medium of claim 1, wherein one or more of the block sub-matrices partitioned from the matrices of the Kalman filter are asymmetrical.

5. The non-transitory computer-readable storage medium of claim 1, wherein the attitude measurements are received from the secondary attitude sensors at irregular or infrequent intervals.

6. The non-transitory computer-readable storage medium of claim 1, wherein the expanded equations derived for the subset of the plurality of block sub-matrices include only one sine and one cosine function be calculated.

7. The non-transitory computer-readable storage medium of claim 1, wherein the computer comprises a flight computer onboard a spacecraft.

8. A computer-implemented method of generating attitude error correction values for attitude measurements of a spacecraft from primary attitude sensors, the method comprising:
   receiving attitude measurements from secondary attitude sensors; and
   generating, by a computing device, the attitude error correction values based on the attitude measurements from the secondary attitude sensors using expanded equations derived for a subset of 3×3, 3×2, 2×3, and 2×2 block sub-matrices partitioned from the matrices of a 8×8 Kalman filter, a remainder of the block sub-matrices being pre-calculated.

9. The method of claim 8, wherein a covariance propagation of the Kalman filter is calculated and updated by a computing device in a single step.

10. The method of claim 8, wherein the expanded equations derived for the subset of the block sub-matrices utilize body-reference frame Kalman filter equations, and wherein the attitude error correction values are converted by a computing device back to earth-centered inertial frame reference value before being provided to an attitude control module of the spacecraft.

11. The method of claim 8, wherein the expanded equations derived for the subset of the block sub-matrices include only one sine and one cosine function be calculated.

12. The method of claim 8, wherein the primary attitude sensors comprise inertial sensors.

13. The method of claim 8, wherein the attitude measurements are received from the primary attitude sensors at frequent and regular intervals.

14. The method of claim 8, wherein the secondary attitude sensors comprise attitude positional sensors.

15. The method of claim 14, wherein the secondary attitude sensors detect a terrestrial RF beacon received at the spacecraft.

16. The method of claim 8, wherein the attitude measurements are received from the secondary attitude sensors at irregular or infrequent intervals.

17. A system for utilizing a modified Kalman filter for generating attitude error correction values for a spacecraft, the system comprising:

primary attitude inertial sensors on board the spacecraft providing attitude measurements at frequent and regular intervals;

secondary attitude positional sensors providing attitude measurements at irregular or infrequent intervals; and an attitude error correction filter module of a flight computer configured to receive the attitude measurements from the primary attitude inertial sensors and the secondary attitude positional sensors, and compute attitude error correction values for the attitude measurements from the primary attitude inertial sensors based on the attitude measurements from the secondary attitude sensors using expanded equations derived for a subset of a plurality of block sub-matrices partitioned into 3×3, 3×2, 2×3, and 2×2 blocks from the matrices of a 8×8 Kalman filter, a remainder of the plurality of block sub-matrices are pre-calculated, wherein a covariance propagation and update of the Kalman filter is calculated and updated in a single step, the expanded equations derived for the subset of the plurality of block sub-matrices utilize body-reference frame Kalman filter equations, and the attitude error correction values are converted back to earth-centered inertial frame reference value before being provided to an attitude control module of the flight computer.

18. The system of claim 17, wherein the flight computer is onboard the spacecraft.

* * * * *